United States Patent
Takagi

[19]

[11] Patent Number: 5,934,427
[45] Date of Patent: Aug. 10, 1999

[54] HYDRAULIC CONTROL APPARATUS FOR LOCK-UP CLUTCH ASSEMBLED WITHIN TORQUE CONVERTER

[75] Inventor: Kiyoharu Takagi, Okazaki, Japan

[73] Assignee: Aisin Seiki Kabushiki Kaisha, Kariya, Japan

[21] Appl. No.: 08/955,608

[22] Filed: Oct. 22, 1997

[30] Foreign Application Priority Data

Oct. 24, 1996 [JP] Japan .................................. 8-282579

[51] Int. Cl.$^6$ .................................................. F16D 33/00
[52] U.S. Cl. ........................ 192/3.3; 192/3.31; 192/3.29
[58] Field of Search ............................... 192/3.31, 3.29, 192/3.28, 3.3; 475/128; 477/151; 184/1.5; 180/423; 91/516, 518

[56] References Cited

U.S. PATENT DOCUMENTS

| | | | |
|---|---|---|---|
| 4,998,604 | 3/1991 | Vukovich et al. . | |
| 5,031,480 | 7/1991 | Kuwayama | 477/151 |
| 5,339,935 | 8/1994 | Ishii et al. . | |
| 5,527,233 | 6/1996 | Tabata | 192/3.31 |
| 5,634,865 | 6/1997 | Jang | 475/128 |

FOREIGN PATENT DOCUMENTS

| | | |
|---|---|---|
| 0 274 079 | 7/1988 | European Pat. Off. . |
| 62-072960 | 3/1987 | Japan . |
| 62-72960 | 4/1987 | Japan . |

OTHER PUBLICATIONS

*Jidosha Gijyutsu Handbook,* published by Jidosha Gijyutsu kai, Mar. 1, 1991, pp. 228–230.

*Primary Examiner*—Charles A. Marmor
*Assistant Examiner*—Tisha D. Waddell
*Attorney, Agent, or Firm*—Burns, Doane, Swecker & Mathis, LLP

[57] ABSTRACT

A hydraulic control apparatus for a lock-up clutch assembled within a torque converter, the lock-up clutch having an engagement-side fluid passage supplied with fluid under line pressure for engagement thereof to establish a direct connection between input and output elements of the torque converter and a release-side fluid passage supplied with the fluid under line pressure for disengagement thereof to release the direct connection between the input and output elements of torque converter. The hydraulic control apparatus includes a modulator vale arranged to modulate fluid under line pressure supplied from a hydraulic pump under control of a regulator valve for supplying fluid under modulated pressure to the release-side fluid passage of the lock-up clutch and a lock-up control valve arranged to connect the engagement-side fluid passage to an inlet fluid passage of a cooler for disengaging the lock-up clutch and to supply the fluid under line pressure to the engagement-side fluid passage for effecting engagement of the lock-up clutch in a condition where the release-side fluid passage is being supplied with the fluid under modulated pressure.

3 Claims, 1 Drawing Sheet

HYDRAULIC CONTROL APPARATUS FOR LOCK-UP CLUTCH ASSEMBLED WITHIN TORQUE CONVERTER

BACKGROUND OF THE INVENTION

1. Field of the Invention

The present invention relates to a hydraulic control apparatus for a hydraulic lock-up clutch assembled within a torque converter disposed between a prime mover of an automotive vehicle and a power transmission.

2. Description of the Prior Art

In Japanese Patent Laid-open Publication No. 62(1982)-72960, there has been proposed a hydraulic control apparatus for a lock-up clutch of the direct-coupling type which includes a lock-up control valve switched over under control of a solenoid valve for selectively supplying fluid under pressure into an engagement-side fluid passage or a release-side fluid passage of the lock-up clutch. When supplied with fluid under high pressure at its engagement-side fluid passage under control of the control valve, the lock-up clutch is engaged to establish a direct connection between input and output elements of the torque converter. When supplied with fluid under high pressure at its release-side fluid passage under control of the control valve, the lock-up clutch is disengaged to release the direct connection between the input and output elements of the torque converter.

In a disengaged condition of the lock-up clutch, the release-side fluid passage of the lock-up clutch is communicated with a fluid supply passage of the lock-up control valve to permit fluid under pressure flowing therefrom into the release-side fluid passage, while the engagement-side fluid passage of the lock-up clutch is communicated with an inlet-side fluid passage of a cooler to permit fluid under pressure flowing into the cooler from the lock-up clutch therethrough. When the lock-up clutch is engaged, the engagement-side fluid passage of the lock-up clutch is communicated with the fluid supply passage of the control valve to permit fluid under pressure supplied into the lockup clutch from the fluid supply passage therethrough, while the release-side fluid passage of the lock-up clutch is communicated with a drain passage to discharge therethrough the fluid under pressure from the lock-up clutch.

In the hydraulic control apparatus, however, if the fluid under pressure may not be smoothly discharged through the drain passage, engagement of the lock-up clutch will be delayed or suddenly effected. To avoid such a problem, it is required to provide a fluid passage of large diameter as the drain passage for effecting smooth discharge of the fluid under pressure in the case that such a fluid passage of large diameter is formed as the drain passage in a housing structure of the control valve, the arrangement of the drain passage in the housing structure becomes complicated in construction. This results in an increase of the manufacturing cost of the hydraulic control apparatus.

SUMMARY OF THE INVENTION

It is, therefore, a primary object of the present invention to provide a hydraulic control apparatus for a lock-up clutch capable of overcoming the problems discussed above in a simple construction.

According to the present invention, the object is accomplished by providing a hydraulic control apparatus for a lock-up clutch assembled within a torque converter, the lock-up clutch having an engagement-side fluid passage supplied with fluid under line pressure for engagement thereof to establish a direct connection between input and output elements of the torque converter and a release-side fluid passage supplied with the fluid under modulated pressure for disengagement thereof to release the direct connection between the input and output elements of the torque converter, which comprises a modulator valve provided with an input fluid passage connected to a fluid supply passage for supplying the fluid under line pressure, an output fluid passage connected to the release-side fluid passage of the lock-up clutch and a discharge passage, the modulator valve having a spring loaded valve element arranged to modulate line pressure of fluid supplied to the input fluid passage from the fluid supply passage for supplying the fluid under modulated pressure to the release-side fluid passage of the lock-up clutch from the output fluid passage, and a lock-up control valve provided with a first fluid passage connected to the release-side fluid passage of the lock-up clutch, a second fluid passage connected to an inlet fluid passage of a cooler, a third fluid passage connected to the engagement-side fluid passage of the lock-up clutch, and a fourth fluid passage connected to the fluid supply passage for supply of the fluid under line pressure, the lock-up control valve having a spring loaded valve element movable between a first position where the valve element is located to interrupt each communication between the first and second fluid passages and between the third and fourth fluid passages and to establish a communication between the second and third fluid passages for disengaging the lock-up clutch and a second position where the valve element is located to interrupt a communication between the second and third fluid passages and to establish each communication between the first and second fluid passages and between the third and fourth fluid passages for effecting engagement of the lock-up clutch.

In a practical embodiment of the present invention, the fluid supply passage for supplying the fluid under line pressure is connected to a hydraulic pump through a regulator valve, the discharge passage is connected to a suction port of the hydraulic pump, and the regulator valve is arranged to modulate fluid under high pressure supplied from the hydraulic pump for supplying the fluid under line pressure to the first fluid passage of the modulator valve through the fluid supply passage.

BRIEF DESCRIPTION OF THE DRAWING

Other objects, features and advantages of the present invention will be more readily appreciated from the following detailed description of a preferred embodiment thereof when taken together with the accompanying single FIGURE, which illustrates a hydraulic control circuit for a lock-up clutch assembled within a torque converter.

DESCRIPTION OF THE PREFERRED EMBODIMENT

Figure 1:
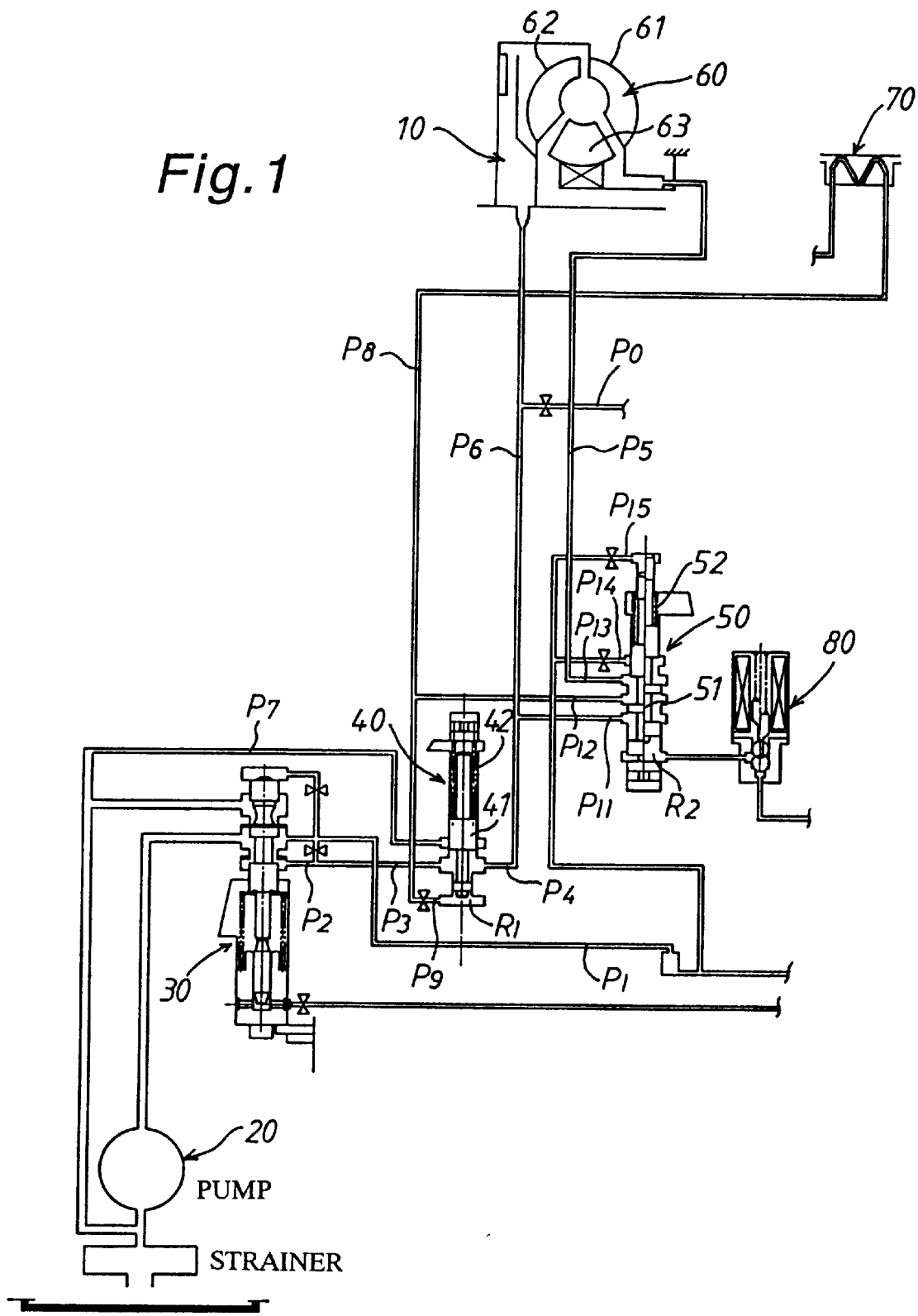

Illustrated in the drawing is a hydraulic control apparatus for a lock-up clutch 10 assembled within a torque converter 60 disposed between a prime mover of an automotive vehicle and a power transmission (not shown). The hydraulic control apparatus includes a primary regulator valve 30 for modulating fluid under high pressure discharged from a hydraulic pump 20 for supplying fluid under line pressure to primary and secondary fluid passages P1 and P2, a secondary regulator valve or modulator valve 40 arranged to modulate the fluid under line pressure supplied to an input fluid passage P3 from the secondary fluid passage P2 for supplying fluid under modulated pressure to an output fluid passage P4, and a lock-up control valve 50 for switching over the lock-up clutch 10 from an engaged condition to a disengaged condition or vice versa. The torque converter 60 is composed of an input element in the form of a fluid pump 61, an output element in the form of a turbine 62 and a stator 63. When the pressure in an engagement-side fluid passage P5 is increased while the pressure in a release-side fluid passage P6 is decreased, the lock-up clutch 10 is engaged to establish a direct connection between the fluid pump 61 and the turbine 62. When the pressure in fluid passage P5 is decreased while the pressure in fluid passage P6 is increased, the lock-up clutch 10 is disengaged to release the turbine 62 from the fluid pump 61.

The secondary regulator valve 40 has the input fluid passage P3 connected to the secondary fluid passage P2, the output fluid passage P4 connected to the release-side fluid passage P6, a discharge passage P7 connected to a suction port of the hydraulic pump 20 and a pilot fluid passage P9 connected to an inlet-side fluid passage P8 of a cooler 70 through an orifice. The secondary regulator valve 40 is composed of a valve spool 41 and a spring 42 biasing the valve spool 41 toward a fluid chamber R1. In the secondary regulator valve 40, the valve spool 41 acts under the load of spring 42 to modulate the line pressure of fluid supplied to the input fluid passage P3 from the secondary fluid passage P2 for supplying the fluid under modulated pressure to the release-side fluid pressure P6 through the output fluid passage P4. In addition, the release-side fluid passage P6 is connected at its intermediate portion to a bypass fluid passage $P_0$ through an orifice for supplying the fluid under modulated pressure as lubricant to a portion to be lubricated.

The lock-up control valve 50 has a first fluid passage P11 connected to the release-side fluid passage P6, a second fluid passage P12 connected to the inlet fluid passage P8 of cooler 70, a third fluid passage P13 connected to the engagement-side fluid passage P5, a fourth fluid passage P14 connected to the primary fluid passage P1 through an orifice, and a pilot fluid passage P15 connected to the primary fluid passage P1 through an orifice. The lock-up control valve 50 is composed of a valve spool 51 and a spring 52 biasing the valve spool 51 toward a fluid chamber R2. In the lock-up control valve 50, the valve spool 51 is moved against the load of spring 51 under control of a solenoid valve 80 which is activated under control of an electric control apparatus (not shown).

When the solenoid valve 80 is in a deactivated condition to interrupt fluid under pressure supplied to the fluid chamber R2, the valve spool 51 is retained in a first position as shown by the left half thereof in the FIGURE to interrupt each communication between the first and second fluid passages P11 and P12 and between the third and fourth fluid passages P13 and P14 and to permit a communication between the second and third fluid passages P12 and P13. In such a condition, the inlet fluid passage P8 of cooler 70 is communicated with the engagement-side fluid passage P5 through the second and third fluid passages P12 and P13. This permits the flow of fluid under modulated pressure supplied from the secondary regulator valve 40 into the lock-up clutch 10 through the release-side fluid passage P6 and permits the flow of fluid under pressure discharged from the lock-up clutch 10 into the inlet fluid passage P8 of cooler 70 through the engagement-side fluid passage P5. As a result, the lock-up clutch 10 is maintained in a disengaged condition, and the fluid under pressure heated by the torque converter 60 is cooled by the cooler 70.

When the solenoid valve 80 is activated to supply the fluid under line pressure into the fluid chamber R2, the valve spool 51 of lock-up control valve 50 is moved upward against the load of spring 52 and retained in a second position as shown by the right half thereof in the FIGURE to interrupt the communication between the second and third fluid passages P12 and P13 and to permit each communication between the first and second fluid passages P11 and P12 and between the third and fourth fluid passages P13 and P14. In such an instance, the release-side fluid passage P6 is communicated with the inlet fluid passage P8 of cooler 70 through the first and second fluid passages P11 and P12, while the engagement-side fluid passage P5 is communicated with the primary fluid passage P1 through the third and fourth fluid passages P13 and P14. This permits the supply of the fluid under line pressure from the primary fluid passage P1 into the engagement-side fluid passage P5 in a condition where the release-side fluid passage P6 is being supplied with the fluid under modulated pressure from the secondary regulator valve 40. As a result, the lock-up clutch 10 is engaged by a difference between the line pressure and modulated pressure and retained in its engaged condition where the fluid under pressure from the engagement-side fluid passage P5 flows into the release-side fluid passage P6 through the lock-up clutch 10 and flows therefrom into the inlet fluid passage P8 of cooler 70 through the first and second fluid passages P11 and P12.

Since the engagement of lock-up clutch 10 is effected by the difference between the line pressure and modulated pressure in a condition where the release-side fluid passage P6 is being supplied with the fluid under modulated pressure, the lock-up clutch 10 is smoothly engaged without any delay and shock in operation.

In the above embodiment, it is to be noted that the secondary regulator valve 40 is provided as a conventional modulator valve between the primary regulator valve 30 and the lock-up control valve 50 without connecting the discharge passage P7 to the lock-up control valve 50. With the arrangement described above, the fluid passages of the lockup control valve 50 can be provided in a simple construction in a valve housing structure (not shown) formed to contain the component parts of the regulator valve 40 and lock-up control valve 50. It is to be also noted that the secondary regulator valve 40 is provided with the pilot fluid passage P9 in connection to the inlet fluid passage P8 of cooler 70 for modulating the line pressure in accordance with an increase of fluid under pressure supplied thereto from the pilot fluid passage P9. With such an arrangement of the secondary regulator valve 40, the modulated pressure can be decreased in accordance with the hydraulic pressure in the inlet fluid passage P8 of cooler 70 to reduce the load acting on the cooler 70 when the lock-up clutch 10 is disengaged and to increase the difference between the line pressure and modulated pressure for reliably effecting engagement of the lock-up clutch.

Additionally, the second and third lands of valve spool 51 in lock-up control valve 50 are formed different in diameter to increase the hydraulic pressure in the engagement-side fluid passage P5 to the line pressure for effecting smooth engagement of the lock-up clutch 10.

What is claimed is:

1. A hydraulic control apparatus for a lock-up clutch assembled within a torque converter, the lock-up clutch having an engagement-side fluid passage supplied with fluid under line pressure for engagement thereof to establish a direct connection between input and output elements of the torque converter and a release-side fluid passage supplied with the fluid under modulated pressure for disengagement thereof to release the direct connection between the input and output elements of the torque converter, comprising:

a modulator valve provided with an input fluid passage connected to a fluid supply passage for supplying the fluid under line pressure and an output fluid passage connected to the release-side fluid passage of said lock-up clutch, said modulator valve having a spring-loaded valve element arranged to modulate line pressure of fluid supplied to the input fluid passage from the fluid supply passage in accordance with a hydraulic pressure in an inlet fluid passage of a cooler for continuously supplying the fluid under modulated pressure to the release-side fluid passage of said lock-up clutch from the output fluid passage, and a lock-up control valve provided with a first fluid passage connected to the release-side fluid passage of said lock-up clutch, a second fluid passage connected to the inlet fluid passage of said cooler, a third fluid passage connected to the engagement-side fluid passage of said lock-up clutch and a fourth fluid passage connected to the fluid supply passage, said lock-up control valve having a spring-loaded valve element movable between a first position where the valve element is located to interrupt each communication between the first and second fluid passages and between the third and fourth fluid passages and to establish communication between the second and third fluid passages to thereby permit the flow of fluid under modulated pressure discharged from said lock-up clutch into the inlet fluid passage of said cooler for disengaging said lock-up clutch and a second position where the valve element is located to interrupt communication between the second and third fluid passages and to establish each communication between the first and second fluid passages and between the third and fourth fluid passages to thereby permit the supply of the fluid under line pressure into the engagement-side fluid passage of said lock-up clutch in a condition in which the release-side fluid passage is being supplied with the fluid under modulated pressure from said modulator valve for effecting engagement of said lock-up clutch.

2. A hydraulic control apparatus for a lock-up clutch as claimed in claim 1, wherein the fluid supply passage for supplying the fluid under line pressure is connected to a hydraulic pump through a regulator valve, and wherein said regulator valve is arranged to modulate fluid under high pressure supplied from said hydraulic pump for supplying the fluid under line pressure to the input fluid passage of said modulator valve through said fluid supply passage.

3. A hydraulic control apparatus for a lock-up clutch as claimed in claim 1, wherein said modulator valve is provided with a pilot passage connected to thee inlet fluid passage of said cooler for modulating the fluid under line pressure in accordance with an increase of fluid pressure applied thereto from the inlet fluid passage of said cooler.

* * * * *